(12) United States Patent
Xu et al.

(10) Patent No.: US 12,155,511 B2
(45) Date of Patent: Nov. 26, 2024

(54) PHASE DIFFERENCE MEASUREMENT METHOD AND SYSTEM FOR ANTENNA ARRAY, AND PHASE COMPENSATION METHOD AND SYSTEM FOR ANTENNA ARRAY

(71) Applicant: PURPLE MOUNTAIN LABORATORIES, Jiangsu (CN)

(72) Inventors: Haipeng Xu, Jiangsu (CN); Yan Li, Jiangsu (CN); Wangdong Qi, Jiangsu (CN)

(73) Assignee: PURPLE MOUNTAIN LABORATORIES, Nanjing (CN)

( * ) Notice: Subject to any disclaimer, the term of this patent is extended or adjusted under 35 U.S.C. 154(b) by 36 days.

(21) Appl. No.: 18/034,699

(22) PCT Filed: Nov. 4, 2020

(86) PCT No.: PCT/CN2020/126408
§ 371 (c)(1),
(2) Date: Apr. 29, 2023

(87) PCT Pub. No.: WO2022/088213
PCT Pub. Date: May 5, 2022

(65) Prior Publication Data
US 2023/0396471 A1  Dec. 7, 2023

(30) Foreign Application Priority Data
Nov. 2, 2020  (CN) .......................... 202011199993.1

(51) Int. Cl.
*H04L 27/00* (2006.01)
*H04B 7/0413* (2017.01)

(52) U.S. Cl.
CPC ....... *H04L 27/0014* (2013.01); *H04B 7/0413* (2013.01); *H04L 2027/0026* (2013.01)

(58) Field of Classification Search
CPC ......... H04L 27/0014; H04L 2027/0026; H04L 2027/0044; H04L 2027/0022; H04B 7/0413
See application file for complete search history.

(56) References Cited

U.S. PATENT DOCUMENTS 9,985,733 B1 *  5/2018  Lee ...................... H04B 17/102
10,033,473 B1 *  7/2018  Kyrolainen ........ H04B 17/3911
(Continued)

FOREIGN PATENT DOCUMENTS

CN        103411528 A       11/2013
CN        106936524 A        7/2017
(Continued)

OTHER PUBLICATIONS

Rong, Wei. (non-official translation: Technology Research on Digital Array Antenna Measurement:), China Master's Theses Full-text Database, Information Science and Technology, Jan. 15, 2016 (Jan. 15, 2016), section 2.2.

*Primary Examiner* — Khanh C Tran
(74) *Attorney, Agent, or Firm* — The Sun IP Law

(57) ABSTRACT

Provided are a phase difference measurement method and system for an antenna array, and a phase compensation method and system for an antenna array. The antenna array includes at least two array elements. The phase difference measurement method includes: measurement is performed to obtain a three-dimensional space far-field phase data set of each array element in an antenna array; a three-dimensional solid angle space is determined, and three-dimensional space far-field phase data of each array element is acquired from the three-dimensional space far-field phase data set, wherein the three-dimensional space far-field phase data of each array element corresponds to the three-dimensional solid angle space, of each array element in the antenna array; and with a three-dimensional space far-field phase (Continued)

data of a first array element in the antenna array as a reference, a phase difference between other array element and the first array element is obtained.

19 Claims, 4 Drawing Sheets

(56) References Cited

U.S. PATENT DOCUMENTS

| | | | |
|---|---|---|---|
| 11,057,119 B2* | 7/2021 | Jing | H04B 17/12 |
| 2009/0304118 A1 | 12/2009 | Yuanzhu | |
| 2013/0027256 A1* | 1/2013 | Guo | H04W 24/06 |
| | | | 343/703 |
| 2014/0273873 A1* | 9/2014 | Huynh | H04B 17/29 |
| | | | 455/67.12 |
| 2018/0062971 A1* | 3/2018 | Kyosti | H04L 43/50 |
| 2020/0213016 A1* | 7/2020 | Jing | H04B 17/102 |

FOREIGN PATENT DOCUMENTS

| | | |
|---|---|---|
| CN | 108258436 A | 7/2018 |
| CN | 109001705 A | 12/2018 |
| CN | 111327560 A | 6/2020 |
| CN | 111505637 A | 8/2020 |

* cited by examiner

Phase compensation is performed on each array element in an antenna array according to an obtained phase difference — S270

PHASE DIFFERENCE MEASUREMENT METHOD AND SYSTEM FOR ANTENNA ARRAY, AND PHASE COMPENSATION METHOD AND SYSTEM FOR ANTENNA ARRAY

CROSS-REFERENCE TO RELATED APPLICATION

The present disclosure claims the priority of Chinese Patent Application 2020111999931, filed in the China Patent Office on Nov. 2, 2020, and entitled "Phase Difference Measurement Method and System for Antenna Array, and Phase Compensation Method for Antenna Array", the entire contents of which are herein incorporated by reference.

TECHNICAL FIELD

The present disclosure relates to the technical field of communications, and in particular, to a phase difference measurement method and system for an antenna array, and a phase compensation method and system for an antenna array.

BACKGROUND

With the development of the fifth generation mobile communication technology, an antenna array based on MIMO (multiple input multiple output) of a large-scale antenna plays an extremely important role therein. However, as the number of array elements of the antenna array increases, the array elements at different positions in the antenna array are more affected by other array elements in the antenna array and the influence by the other array elements are more complex, and a phase difference between different array elements affects the performance of a wireless communication system.

Therefore, it is usually necessary to measure the phase difference between different array elements in the antenna array, and then the phases of the different array elements in the antenna array are kept consistent by means of a phase compensation method. An MIMO antenna array probe measurement method may be used to obtain the phase difference of a certain angle in different array element directions of the antenna array, so as to perform phase compensation at the specific angle; and far-field microwave anechoic chamber measurement method may be used to obtain the phase difference between two-dimensional tangent planes of the different array elements of the antenna array, so as to perform phase compensation on the two-dimensional tangent plane. However, this is not enough.

SUMMARY

In view of this, it is necessary to provide a phase difference measurement method and system for an antenna array, and a phase compensation method and system for an antenna array, so as to solve the above problems.

A phase difference measurement method for an antenna array, wherein the antenna array includes at least two array elements, and the method includes:
performing measurement to obtain a three-dimensional space far-field phase data set of each array element in the antenna array;
determining a three-dimensional solid angle space, and acquiring three-dimensional space far-field phase data of each array element in the antenna array from the three-dimensional space far-field phase data set of each array element, wherein the three-dimensional space far-field phase data of each array element corresponds to the three-dimensional solid angle space; and
with a three-dimensional space far-field phase data of a first array element in the antenna array as a reference, obtaining a phase difference between other array element and the first array element, wherein the three-dimensional space far-field phase data of the first array element corresponds to the three-dimensional solid angle space.

By means of the phase difference measurement method for the antenna array, the measurement of the phase difference between different array elements of the antenna array in a three-dimensional space can be realized, and meanwhile, the measurement of the phase difference in different dimensions can be realized according to actual requirements, so that the flexibility is high.

A phase difference measurement system for an antenna array, including a near-field microwave anechoic chamber, a near-field measurement device and the antenna array, wherein the antenna array includes at least two array elements, and the near-field measurement device is able to obtain a three-dimensional space far-field phase data set of each array element of the antenna array; and
the phase difference measurement system for the antenna array further includes an acquiring element, configured to determine a three-dimensional solid angle space, and acquire three-dimensional space far-field phase data of each array element in the antenna array from the three-dimensional space far-field phase data set of each array element, wherein the three-dimensional space far-field phase data of each array element corresponds to the three-dimensional solid angle space; and
a computing element, configured to, with a three-dimensional space far-field phase data of a first array element in the antenna array as a reference, obtain a phase difference between other array element and the first array element, wherein the three-dimensional space far-field phase data of the first array element corresponds to the three-dimensional solid angle space.

The phase difference measurement system for the antenna array mentioned above can realize the measurement of the phase difference between different array elements of the antenna array in the three-dimensional space, and meanwhile can realize the measurement of the phase difference in different dimensions according to actual requirements, so that the flexibility is high.

A phase compensation method for an antenna array, wherein the method includes the phase difference measurement method for the antenna array mentioned above, and further includes a step of performing phase compensation on each array element in the antenna array according to the obtained phase difference.

By means of the phase compensation method for the antenna array, the phase compensation of different array elements of the antenna array in the three-dimensional space can be realized, and the phase consistency of the different array elements of the antenna array in the three-dimensional space is guaranteed. Meanwhile, phase compensation in different dimensions can be realized according to actual requirements, so that the flexibility is high.

A phase compensation system for an antenna array, including the phase difference measurement system for the antenna array mentioned above, wherein the phase compensation system for the antenna array further includes a compensating element, configured to perform phase compensation on each array element in the antenna array according to the obtained phase difference.

The phase compensation system for the antenna array can realize the phase compensation of different array elements of the antenna array in the three-dimensional space, and guarantee the phase consistency of the different array elements of the antenna array in the three-dimensional space. Meanwhile, the phase compensation system for the antenna array can realize phase compensation in different dimensions according to actual requirements, so that the flexibility is high.

BRIEF DESCRIPTION OF THE DRAWINGS

In order to better describe and illustrate embodiments of the present disclosure, reference may be made to one or more drawings, but additional details or examples for describing the drawings should not be considered to be limitations to the scope of any one of inventions of the present disclosure, and the currently described embodiments or preferred manners.

DETAILED DESCRIPTION OF THE EMBODIMENTS

In order to make the objectives, technical solutions and advantages of the present disclosure clearer, the present disclosure will be further described in detail below with reference to the drawings and embodiments. It should be understood that, the specific embodiments described herein are merely used for explaining the present disclosure, and are not used for limiting the present disclosure.

Figure 1:
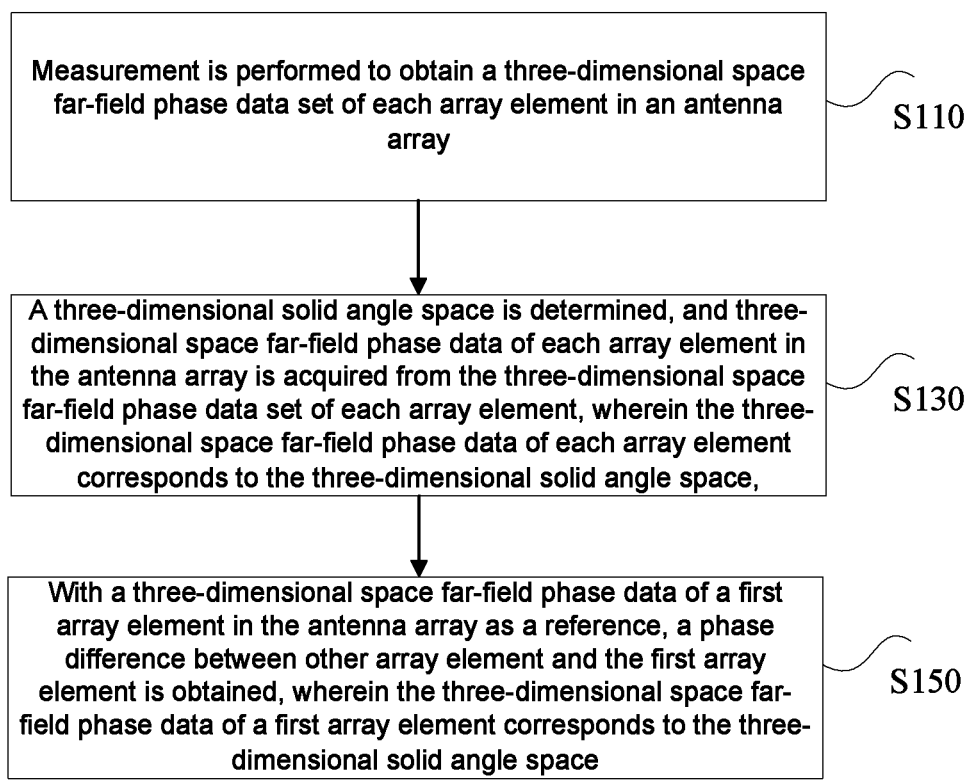
FIG. 1 is a schematic flowchart of a phase difference measurement method for an antenna array according to an embodiment of the present disclosure.
Figures 4, 5:
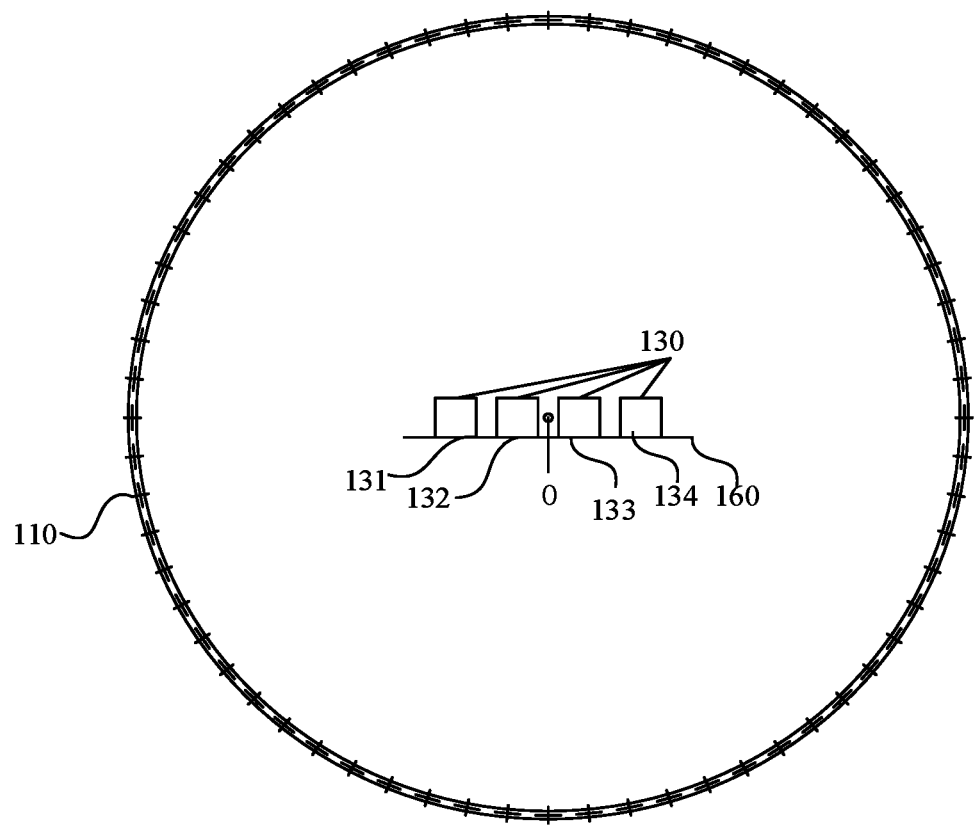
FIG. 4 is a schematic structural diagram of a phase difference measurement system for an antenna array according to an embodiment of the present disclosure.
FIG. 5 is a flowchart of sub-steps of a phase compensation method for an antenna array according to an embodiment of the present disclosure.

Please refer to FIG. 1 and FIG. 4, which are respectively a schematic flowchart of a phase difference measurement method for an antenna array and a schematic diagram of a phase difference measurement system for an antenna array according to an embodiment of the present disclosure. The antenna array includes at least two array elements. As shown in FIG. 1, the method includes step S110: measurement is performed to obtain a three-dimensional space far-field phase data set of each array element in the antenna array. In the step, the three-dimensional space far-field phase data set of each array element may be obtained in sequence. In the present embodiment, the antenna array includes four array elements, and other numbers of array elements may also be set in other embodiments according to actual requirements, which is not particularly limited herein. Please refer to FIG. 4, in the present embodiment, the step of acquiring the three-dimensional space far-field phase data set of each array element in the antenna array includes: respectively acquiring three-dimensional space far-field phase data sets A1, A2, A3 and A4 of an array element 131, an array element 132, an array element 133 and an array element 134. The three-dimensional space far-field phase data set of each array element includes a plurality of three-dimensional space far-field phase data. It can be understood that, the step of performing measurement to obtain the three-dimensional space far-field phase data set of each array element in the antenna array is performed in a stable measurement environment. In one embodiment, the method further includes a step of waiting for the measurement environment to be stable, for example, the measurement system may be started, and the step S110 is performed after waiting for half an hour. In this way, the obtained phase data may be more accurate.

In step S130, a three-dimensional solid angle space is determined, and three-dimensional space far-field phase data of each array element in the antenna array is acquired from the three-dimensional space far-field phase data set of each array element, wherein the three-dimensional space far-field phase data of each array element corresponds to the three-dimensional solid angle space. Since there is a certain radiation direction in an antenna, the three-dimensional solid angle space may be determined according to a far-field angle range of the antenna array in the actual application, and is a part of a three-dimensional space. In one embodiment, the far-field angle range of the antenna array includes an azimuth angle range and a pitch angle range. In the present embodiment, the azimuth angle range of the far-field angle range of the antenna array ranges from −60° to 60°, and the pitch angle range of the far-field angle range of the antenna array ranges from −60° to 60°. In other embodiments, different azimuth angle ranges and pitch angle ranges of the far-field angle may also be selected, such as −50° to 70°. According to an angle correspondence between the far-field angle of the array element and the far-field angle range of the antenna array, the far-field phase data of each array element within the range of the determined three-dimensional solid angle space may be obtained by means of corresponding computing or programming. In the present embodiment, the three-dimensional space far-field phase data of the array element 131, the array element 132, the array element 133 and the array element 134 are respectively b1, b2, b3 and b4, wherein b1, b2, b3 and b4 correspond to the three-dimensional solid angle space and are acquired from the three-dimensional space far-field phase data set of the above array elements. It can be understood that, the three-dimensional space far-field phase data b1, b2, b3 and b4 of the array element 131, the array element 132, the array element 133 and the array element 134 are respectively elements in the three-dimensional space far-field phase data sets A1, A2, A3 and A4 of the array element 131, the array element 132, the array element 133 and the array element 134.

In step S150: with three-dimensional space far-field phase data of a first array element in the antenna array as a reference, a phase difference between other array element and the first array element is obtained, wherein the three-dimensional space far-field phase data of the first array element corresponds to the three-dimensional solid angle space. The first array element is a reference array element for measuring the phase difference in the antenna array, and is not intended to limit the position thereof in the antenna array, so that the first array element may be any optional array element in the antenna array. With reference to FIG. 4, in the present embodiment, the first array element is the array element 131, and in other embodiments, the first array element may also be the array element 132, the array element 133, or the array element 134, which may be selected according to actual situations and is not limited herein. The phase difference between the other array element and the first array element is the difference between the three-dimensional space far-field phase data of the three-dimensional solid angle space of the other array element and the three-dimensional space far-field phase data of the three-dimensional solid angle space of the first array element. In the present embodiment, for example, the phase difference d21 between the array element 132 and the first array element 131 is the difference between the three-dimensional space far-field phase data b2 of the three-dimensional solid angle space of the array element 132 and the three-dimensional space far-field phase data b1 of the three-dimensional solid angle space of the first array element 131. The phase difference d31 between the array element 133 and the first array element 131 is the difference between the three-dimensional space far-field phase data b3 of the three-dimensional solid angle space of the array element 133 and the three-dimensional space far-field phase data b1 of the three-dimensional solid angle space of the first array element 131. The phase difference d41 between the array element 134 and the first array element 131 is the difference between the three-dimensional space far-field phase data b4 of the three-dimensional solid angle space of the array element 134 and the three-dimensional space far-field phase data b1 of the three-dimensional solid angle space of the first array element 131.

It can be understood that, in the case where both the azimuth angle and the pitch angle are determined, the far-field phase data of the present disclosure may merely include a phase value, so that the phase difference measurement method may be configured to measure the phase difference between different array elements at a certain specific angle. The three-dimensional space far-field phase data of the array element may also be in the form of a matrix. The three-dimensional space far-field phase data of the array element includes the phase value of the array element, and at least one of the azimuth angle and the pitch angle. In the case where the azimuth angle is determined, the phase data may include the phase value and the pitch angle, so that the phase difference measurement method may be configured to measure the phase difference between two-dimensional tangent planes of different array elements at a specific azimuth angle. Similarly, in the case where the pitch angle is determined, the phase data may include the phase value and the azimuth angle, so that the phase difference measurement method may be configured to measure the phase difference between the two-dimensional tangent planes of different array elements at a specific pitch angle. In the present embodiment, the far-field phase data matrix may be a ternary matrix, which includes the phase value, the azimuth angle and the pitch angle. In this way, the phase difference measurement method may be configured to measure the phase difference between different array elements in the three-dimensional space. For example, in the present embodiment, far-field phase data with the same azimuth angle and pitch angle may be selected as the far-field phase data b2 of the three-dimensional solid angle space of the array element 132 and the far-field phase data b1 of the three-dimensional solid angle space of the first array element 131 for comparison, so as to obtain the phase difference d21 between the array element 132 and the array element 131 in the case of the same azimuth angle and pitch angle.

Compared with an MIMO antenna array probe measurement method in which the phase difference of only one angle in the normal direction of different array elements of the antenna array may be obtained, by means of the phase difference measurement method for the antenna array of the present disclosure, the phase difference of one angle in a specific direction may be obtained; and compared with far-field microwave anechoic chamber measurement method in which only the phase difference of two-dimensional tangent planes between different array elements of the antenna array may be obtained, by means of the method of the present disclosure, not only the phase difference of different two-dimensional tangent planes between different array elements of the antenna array may be obtained, but the phase difference of the three-dimensional solid angle spaces between different array elements of the antenna array may also be measured. Therefore, by means of the phase difference measurement method for the antenna array, the measurement of the phase difference between different array elements of the antenna array in the three-dimensional space may be realized, and meanwhile, the measurement of the phase difference in different dimensions may be realized according to actual requirements, so that the flexibility is high.

Figure 2:
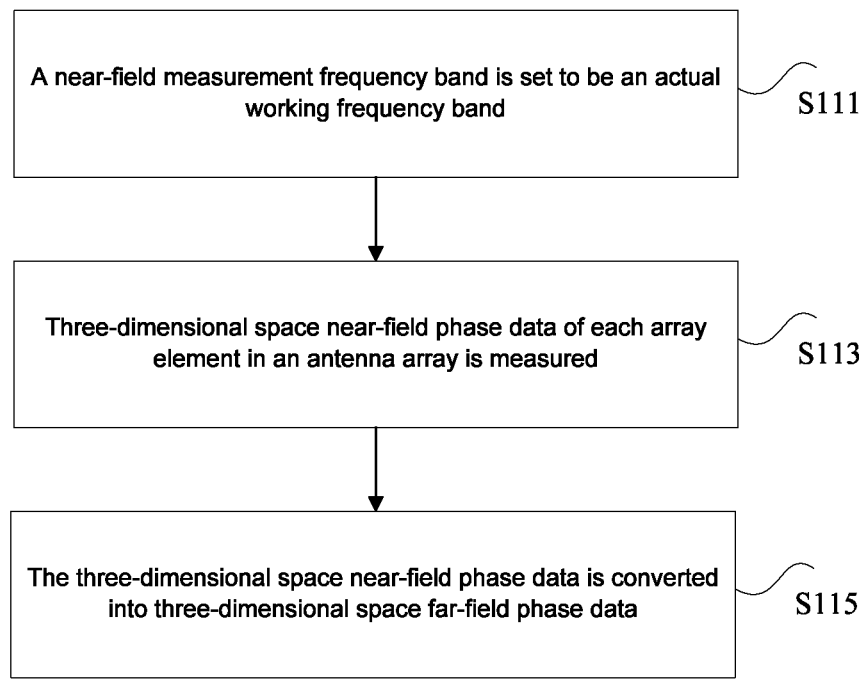
FIG. 2 is a flowchart of sub-steps of a phase difference measurement method for an antenna array according to an embodiment of the present disclosure.

Please refer to FIG. 2, it is a flowchart of sub-steps of a phase difference measurement method for an antenna array according to an embodiment of the present disclosure. In the present embodiment, the step S110 of performing measurement to obtain the three-dimensional space far-field phase data set of each array element in the antenna array further includes a step S113 of measuring three-dimensional space near-field phase data of each array element in the antenna array, and a step S115 of converting the three-dimensional space near-field phase data into the three-dimensional space far-field phase data. The three-dimensional space near-field phase data of the array element may be obtained by means of any known method, the near-field phase data may be converted into the far-field phase data by means of a near-far-field transformation algorithm, including but not limited to, for example, a planar far-near-field transformation algorithm and the like. In this way, the far-field phase data may be obtained by measuring the near-field phase data, which is more convenient.

According to an embodiment of the present disclosure, before the step S113 of measuring the three-dimensional space near-field phase data of each array element in the antenna array, the method further includes a step S111 of setting a near-field measurement frequency band to be an actual working frequency band. Therefore, it is ensured that the measured phase data may be closer to actual working requirements, thereby being more accurate.

According to an embodiment of the present disclosure, before the step S113 of measuring the three-dimensional space near-field phase data of each array element in the antenna array, the method further includes a step of respectively disposing each array element at the center of a near-field microwave anechoic chamber. That is, before the three-dimensional space near-field phase data of the array element is measured each time, the antenna array is moved, and the array element to be measured is disposed at the center of the near-field microwave anechoic chamber, so as to ensure that the near-field phase data of all array elements is measured at the center of the near-field microwave anechoic chamber, so that the obtained phase data is more accurate.

According to an embodiment of the present disclosure, the step S112 of respectively disposing each array element at the center of the near-field microwave anechoic chamber includes: disposing the array element at the center of the near-field microwave anechoic chamber by means of a structural member with scale strips, so that the setting is more convenient and accurate.

Figure 3:
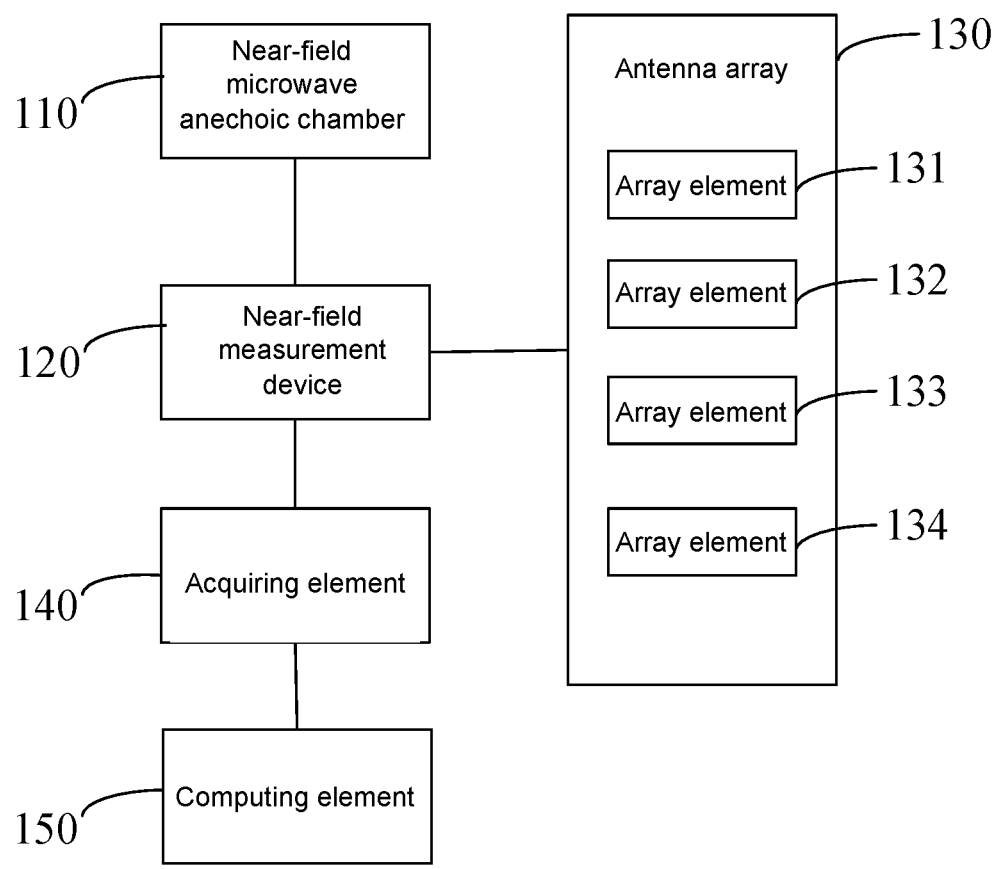
FIG. 3 is a structural block diagram of a phase difference measurement system for an antenna array according to an embodiment of the present disclosure.

Please refer to FIG. 3 and FIG. 4, which are respectively a schematic block diagram and a schematic diagram of a phase difference measurement system for an antenna array according to an embodiment of the present disclosure. As shown in the figures, the phase difference measurement system for the antenna array includes a near-field microwave anechoic chamber 110, a near-field measurement device 120, an antenna array 130, an acquiring element 140, and a computing element 150, wherein the antenna array 130 is disposed in the near-field microwave anechoic chamber 110, and the near-field measurement device 120 is configured to obtain a far-field phase data set of each array element of the antenna array in the near-field microwave anechoic chamber 110. The acquiring element 140 is configured to determine a three-dimensional solid angle space, and acquire far-field phase data of each array element in the antenna array from the far-field phase data set of each array element, wherein the far-field phase data of each array element corresponds to the three-dimensional solid angle space. The computing element 150 is configured to, with three-dimensional space far-field phase data of a first array element in the antenna array as a reference, obtain a phase difference between other array element and the first array element, wherein the three-dimensional space far-field phase data of the first array element corresponds to the three-dimensional solid angle space. The first array element is a reference array element for measuring the phase difference in the antenna array, and is not intended to limit the position thereof in the antenna array, so that the first array element may be any optional array element in the antenna array.

The antenna array includes at least two array elements, and in the present embodiment, the antenna array 130 includes four array elements 131, 132, 133 and 134. In other embodiments, the antenna array may also include other numbers of array elements according to actual requirements. Three-dimensional space far-field phase data sets A1, A2, A3 and A4 of the array elements 131, 132, 133 and 134 of the antenna array 130 may be obtained by the near-field measurement device. Further, the near-field measurement device is configured to measure three-dimensional space near-field phase data of each array element, and convert the three-dimensional space near-field phase data into three-dimensional space far-field phase data, so as to obtain the three-dimensional space far-field phase data of each array element. In some embodiments, the obtained near-field phase data may further include an amplitude value, and therefore, the far-field phase data obtained by conversion also includes an amplitude value.

It can be understood that, in the case where both an azimuth angle and a pitch angle are determined, the far-field phase data of the present disclosure may merely include a phase value, so that the phase difference measurement system may be configured to measure the phase difference between different array elements at a certain specific angle. The three-dimensional space far-field phase data of the array element may also be in the form of a matrix. The three-dimensional space far-field phase data of the array element includes the phase value of the array element, and at least one of the azimuth angle and the pitch angle. In the case where the azimuth angle is determined, the phase data may include the phase value and the pitch angle, so that the phase difference measurement system may be configured to measure the phase difference of two-dimensional tangent planes between different array elements at a specific azimuth angle. Similarly, in the case where the pitch angle is determined, the phase data may include the phase value and the azimuth angle, so that the phase difference measurement system may be configured to measure the phase difference of two-dimensional tangent planes between different array elements at a specific pitch angle. In the present embodiment, the far-field phase data matrix may be a ternary matrix, which includes the phase value, the azimuth angle and the pitch angle. In this way, the phase difference measurement system may be configured to measure the phase difference between different array elements in the three-dimensional space.

Therefore, the phase difference measurement system for the antenna array is simple in structure and is convenient to build, and compared with a common near-field antenna amplitude measurement system, there is no need to add an additional complex measurement device. Moreover, the measurement of the phase difference between different array elements of the antenna array in the three-dimensional space may be realized, and the measurement of the phase in different dimensions may be realized according to actual requirements, so that the flexibility is high.

According to an embodiment of the present disclosure, the near-field microwave anechoic chamber 110 is a multi-probe spherical near-field measurement microwave anechoic chamber. By using the multi-probe spherical near-field measurement microwave anechoic chamber, the three-dimensional space far-field phase data of each array element of the antenna array may be conveniently obtained.

According to an embodiment of the present disclosure, the phase difference measurement system for the antenna array further includes a structural member with scales (not shown), and the array element may be sequentially disposed at the center O of the near-field microwave anechoic chamber 110 by means of the structural member with scales. In this way, the measured near-field data of the array element is more accurate.

According to an embodiment of the present disclosure, the phase difference measurement system for the antenna array further includes a support structure 160, and the support structure is configured to fix the antenna array 130 and the structural member with scales. In the present embodiment, the support structure is a bracket. Therefore, the stability of the antenna array 130 may be maintained during measurement, and the accuracy of the obtained data is ensured.

The present disclosure further discloses a phase compensation method for an antenna array, and FIG. 5 is a flowchart of sub-steps of a phase compensation method for an antenna array according to an embodiment of the present disclosure. The method includes the phase difference measurement method for the antenna array, and further includes a step S270 of performing phase compensation on each array element in the antenna array according to the obtained phase difference. In the present embodiment, the array element 132 is compensated according to the phase difference d21 between the array element 132 and the first array element 131, so that the phases of the array element 132 and the first array element 131 are consistent. Similarly, the array element 133 is compensated according to the phase difference d31 between the array element 133 and the first array element 131, so that the phases of the array element 133 and the first array element 131 are consistent. The array element 134 is compensated according to the phase difference d41 between the array element 134 and the first array element 131, so that the phases of the array element 134 and the first array element 131 are consistent. Finally, the phases of all array elements in the antenna array 130 are consistent with the phase of the first array element 131, thereby ensuring the phase consistency of the antenna array 130 in the three-dimensional solid angle space.

Compared with the MIMO antenna array probe measurement method in which a phase consistency compensation value of only one angle in the normal direction of different array elements of the antenna array may be obtained, by means of the phase difference compensation method for the antenna array of the present disclosure, the phase consistency compensation value of one angle in a specific direction may be obtained; and compared with far-field microwave anechoic chamber measurement in which only the phase consistency compensation values of two-dimensional tangent planes between different array elements of the antenna array may be obtained, by means of the method of the present disclosure, not only can the phase consistency compensation values of different two-dimensional tangent planes between different array elements of the antenna array be obtained, but the phase consistency compensation values of the three-dimensional solid angle spaces between different array elements of the antenna array can also be measured. Therefore, by means of the phase difference compensation method for the antenna array, phase compensation between different array elements in the antenna array in the three-dimensional space can be realized, and meanwhile, phase compensation in different dimensions can be realized according to actual requirements, so that the flexibility is high.

The present disclosure further discloses a phase compensation system for an antenna array, including a near-field microwave anechoic chamber, a near-field measurement device and the antenna array, wherein the antenna array includes at least two array elements, and the near-field measurement device may obtain a three-dimensional space far-field phase data set of each array element in the antenna array. The phase compensation system for the antenna array further includes an acquiring element, configured to determine a three-dimensional solid angle space, and acquire three-dimensional space far-field phase data of each array element in the antenna array from the three-dimensional space far-field phase data set of each array element, wherein the three-dimensional space far-field phase data of each array element corresponds to the three-dimensional solid angle space; a computing element, configured to, with a three-dimensional space far-field phase data of a first array element in the antenna array as a reference, obtain a phase difference between other array element and the first array element, wherein the three-dimensional space far-field phase data of the first array element corresponds to the three-dimensional solid angle space; and a compensating element, configured to perform phase compensation on each array element in the antenna array according to the obtained phase difference.

The phase compensation system for the antenna array of the present disclosure can not only obtain the phase consistency compensation values of different two-dimensional tangent planes between different array elements in the antenna array, but may also measure the phase consistency compensation values of the three-dimensional solid angle spaces between different array elements of the antenna array. Therefore, by means of the phase difference compensation method for the antenna array, phase compensation of different array elements in the antenna array in the three-dimensional space can be realized, and meanwhile, phase compensation in different dimensions can be realized according to actual requirements, so that the flexibility is high.

All or part of units of the phase difference measurement system for the antenna array and the phase compensation system for the antenna array may be implemented in whole or in part by software, hardware and a combination thereof. The foregoing units may be embedded into or independent of a processor in a server in the form of hardware, and may also be stored in a memory in the server in the form of software, so that the processor calls and executes an operation corresponding to each unit.

Various technical features of the above embodiments may be combined arbitrarily, for the conciseness of description, no all possible combinations of the various technical features in the above embodiments are described. However, as long as there is no conflict among the combinations of these technical features, they should be considered within the scope recorded in the present specification.

The above embodiments only express several embodiments of the present invention, and the description thereof is more specific and detailed, but cannot thus be understood as limitations to the patent scope of the present invention. It should be noted that, for those ordinary skilled in the art, several variations and improvements may be made without departing from the concept of the present invention, and all these variations and improvements fall within the protection scope of the present invention. Therefore, the protection scope of the present invention shall be subject to the appended claims.

What is claimed is:

1. A phase difference measurement method for an antenna array, wherein the antenna array comprises at least two array elements, and the method comprises:
    performing measurement to obtain a three-dimensional space far-field phase data set of each array element in the antenna array;
    determining a three-dimensional solid angle space, and acquiring three-dimensional space far-field phase data of each array element in the antenna array from the three-dimensional space far-field phase data set of each array element, wherein the three-dimensional space far-field phase data of each array element corresponds to the three-dimensional solid angle space; and
    with a three-dimensional space far-field phase data of a first array element in the antenna array as a reference, obtaining a phase difference between other array element and the first array element, wherein the three-dimensional space far-field phase data of the first array element corresponds to the three-dimensional solid angle space.

2. The phase difference measurement method for the antenna array as claimed in claim 1, wherein performing measurement to obtain the three-dimensional space far-field phase data set of each array element in the antenna array comprises: measuring three-dimensional space near-field phase data of each array element in the antenna array, and converting the three-dimensional space near-field phase data into the three-dimensional space far-field phase data.

3. The phase difference measurement method for the antenna array as claimed in claim 2, wherein the method further comprises: setting a near-field measurement frequency band to be an actual working frequency band.

4. The phase difference measurement method for the antenna array as claimed in claim 2, wherein before measuring the three-dimensional space near-field phase data of each array element in the antenna array, the method further comprises: respectively disposing each array element at a center of a near-field microwave anechoic chamber.

5. The phase difference measurement method for the antenna array as claimed in claim 4, wherein respectively disposing each array element at the center of the near-field microwave anechoic chamber comprises: disposing each array element at the center of the near-field microwave anechoic chamber by means of a structural member with scale strips.

6. The phase difference measurement method for the antenna array as claimed in claim 1, wherein determining the three-dimensional solid angle space comprises: determining the three-dimensional solid angle space according to a far-field angle range of the antenna array.

7. The phase difference measurement method for the antenna array as claimed in claim 6, wherein the far-field angle range of the antenna array comprises an azimuth angle and a pitch angle.

8. The phase difference measurement method for the antenna array as claimed in claim 7, wherein the azimuth angle ranges from −60° to 60°, and the pitch angle ranges from −60° to 60°.

9. The phase difference measurement method for the antenna array as claimed in claim 1, wherein the three-dimensional space far-field phase data is in a form of a matrix, and the three-dimensional space far-field phase data of the array element comprises a phase value of the array element, and at least one of an azimuth angle and a pitch angle.

10. The phase difference measurement method for the antenna array as claimed in claim 9, wherein the three-dimensional space far-field phase data further comprises an amplitude value.

11. A phase difference measurement system for an antenna array, comprising a near-field microwave anechoic chamber, a near-field measurement device and the antenna array, wherein the antenna array comprises at least two array elements, and the near-field measurement device is able to obtain a three-dimensional space far-field phase data set of each array element of the antenna array;

the phase difference measurement system for the antenna array further comprises an acquiring element, configured to determine a three-dimensional solid angle space, and acquire three-dimensional space far-field phase data of each array element in the antenna array from the three-dimensional space far-field phase data set of each array element, wherein the three-dimensional space far-field phase data of each array element corresponds to the three-dimensional solid angle space; and a computing element, configured to, with a three-dimensional space far-field phase data of a first array element in the antenna array as a reference, obtain a phase difference between other array element and the first array element, wherein the three-dimensional space far-field phase data of the first array element corresponds to the three-dimensional solid angle space.

12. The phase difference measurement system for the antenna array as claimed in claim 11, wherein the near-field measurement device is configured to measure three-dimensional space near-field phase data of each array element, and convert the three-dimensional space near-field phase data into three-dimensional space far-field phase data.

13. The phase difference measurement system for the antenna array as claimed in claim 11, wherein the near-field microwave anechoic chamber is a multi-probe spherical near-field measurement microwave anechoic chamber.

14. The phase difference measurement system for the antenna array as claimed in claim 11, further comprising a structural member with scales, wherein each array element is disposed at a center of the near-field microwave anechoic chamber by means of the structural member with scales.

15. The phase difference measurement system for the antenna array as claimed in claim 14, further comprising a support structure, wherein the support structure is configured to fix the antenna array and the structural member.

16. The phase difference measurement system for the antenna array as claimed in claim 15, wherein the support structure is a bracket.

17. The phase difference measurement system for the antenna array as claimed in claim 11, wherein the far-field phase data is in a form of a matrix, the three-dimensional space far-field phase data of the array element comprises a phase value of the array element, and at least one of an azimuth angle and a pitch angle.

18. The phase difference measurement system for the antenna array as claimed in claim 17, wherein the three-dimensional space far-field phase data further comprises an amplitude value.

19. A phase compensation method for an antenna array, comprising:

performing measurement to obtain a three-dimensional space far-field phase data set of each array element in the antenna array;

determining a three-dimensional solid angle space, and acquiring three-dimensional space far-field phase data of each array element in the antenna array from the three-dimensional space far-field phase data set of each array element, wherein the three-dimensional space far-field phase data of each array element corresponds to the three-dimensional solid angle space;

with a three-dimensional space far-field phase data of a first array element in the antenna array as a reference, obtaining a phase difference between other array element and the first array element, wherein the three-dimensional space far-field phase data of the first array element corresponds to the three-dimensional solid angle space; and performing phase compensation on each array element in the antenna array according to the obtained phase difference.

* * * * *